US011995056B2

United States Patent
Magpantay et al.

(10) Patent No.: US 11,995,056 B2
(45) Date of Patent: May 28, 2024

(54) DATABASE FOR A COORDINATE SYSTEM OF AN AIRCRAFT

(71) Applicant: Wilder Systems Inc., Austin, TX (US)

(72) Inventors: Nicole Magpantay, Austin, TX (US); William Wilder, Austin, TX (US)

(73) Assignee: WILDER SYSTEMS, INC., Austin, TX (US)

( * ) Notice: Subject to any disclaimer, the term of this patent is extended or adjusted under 35 U.S.C. 154(b) by 0 days.

(21) Appl. No.: 18/447,300

(22) Filed: Aug. 9, 2023

(65) Prior Publication Data

US 2024/0054116 A1 Feb. 15, 2024

Related U.S. Application Data

(60) Provisional application No. 63/481,576, filed on Jan. 25, 2023, provisional application No. 63/481,563, filed on Jan. 25, 2023, provisional application No. 63/377,149, filed on Sep. 26, 2022, provisional application No. 63/398,202, filed on Aug. 15, 2022, provisional application No. 63/398,203, filed on Aug.
(Continued)

(51) Int. Cl.
*G06F 16/00* (2019.01)
*G06F 16/22* (2019.01)
*B64F 5/40* (2017.01)

(52) U.S. Cl.
CPC .............. *G06F 16/22* (2019.01); *B64F 5/40* (2017.01)

(58) Field of Classification Search
CPC .................................. G06F 16/22; B64F 5/40
See application file for complete search history.

(56) References Cited

U.S. PATENT DOCUMENTS 11,113,567 B1    9/2021   Durand et al.
11,331,799 B1    5/2022   Shafer
(Continued)

FOREIGN PATENT DOCUMENTS

CN      114330030 A   *   4/2022
WO    2022186777 A1     9/2022

OTHER PUBLICATIONS

Oridate, "Velocity-Based Robot Motion Planner for Under-Constrained Trajectories with Part-Specific Geometric Variances", The University of Texas, Dec. 2021, 178 pages.

*Primary Examiner* — Dinku W Gebresenbet
(74) *Attorney, Agent, or Firm* — Kilpatrick Townsend & Stockton LLP

(57) ABSTRACT

Techniques are described herein for generating a database. A method can include receiving a first value associated with a physical element of a target object and obtained during a performance of a first stage of a robot task, and a second value associated with the physical element and obtained during a second stage, wherein the first and second value describe a same characteristic of the physical element and are represented in a target object coordinate system. A third value associated with a tool of a robot and obtained during a third stage can be received, wherein the third value is represented in the robot coordinate system. A first data structure can be generated, wherein the first data structure comprises the first, second, and third value. The first data structure can be associated with a second data structure, wherein the second data structure comprises a fourth value identifying the target object.

19 Claims, 6 Drawing Sheets

Related U.S. Application Data 15, 2022, provisional application No. 63/396,938, filed on Aug. 10, 2022.

(56) References Cited

U.S. PATENT DOCUMENTS

| | | | |
|---|---|---|---|
| 11,341,596 B2 | 5/2022 | Lee et al. | |
| 11,553,969 B1 | 1/2023 | Lang et al. | |
| 11,555,903 B1 | 1/2023 | Kroeger | |
| 11,865,696 B1 | 1/2024 | Wilder et al. | |
| 2003/0149502 A1 | 8/2003 | Rebello et al. | |
| 2004/0039465 A1 | 2/2004 | Boyer et al. | |
| 2014/0305217 A1 | 10/2014 | Tapia et al. | |
| 2015/0314888 A1 | 11/2015 | Reid et al. | |
| 2017/0182666 A1 | 6/2017 | Szarski et al. | |
| 2018/0060364 A1* | 3/2018 | Zengerle | G06F 16/211 |
| 2020/0134860 A1 | 4/2020 | Haven et al. | |
| 2020/0164531 A1 | 5/2020 | Wagner et al. | |
| 2020/0311616 A1 | 10/2020 | Rajkumar et al. | |
| 2020/0383734 A1 | 12/2020 | Dahdouh | |
| 2021/0138600 A1 | 5/2021 | Sato et al. | |
| 2021/0229835 A1* | 7/2021 | Carberry | B33Y 10/00 |
| 2021/0248289 A1* | 8/2021 | Fasano | G05B 17/02 |
| 2021/0356572 A1 | 11/2021 | Kadambi et al. | |
| 2021/0370509 A1 | 12/2021 | Pivac | |
| 2022/0066456 A1 | 3/2022 | Ebrahimi Afrouzi et al. | |
| 2022/0187841 A1 | 6/2022 | Ebrahimi Afrouzi et al. | |
| 2022/0193894 A1 | 6/2022 | Barry et al. | |
| 2022/0197306 A1* | 6/2022 | Cella | G05D 1/0221 |
| 2023/0108488 A1 | 4/2023 | Humayun et al. | |
| 2023/0109541 A1 | 4/2023 | Ando | |
| 2023/0114137 A1 | 4/2023 | Wu et al. | |
| 2023/0124599 A1 | 4/2023 | Fan | |
| 2023/0131458 A1 | 4/2023 | Isonni et al. | |
| 2023/0158716 A1 | 5/2023 | Nishimuta et al. | |
| 2023/0347509 A1 | 11/2023 | Terasawa | |

\* cited by examiner

DATABASE FOR A COORDINATE SYSTEM OF AN AIRCRAFT

CROSS-REFERENCE TO RELATED APPLICATIONS

This application claims priority under 35 U.S.C. § 119(e) to U.S. Provisional Application No. 63/396,938, filed Aug. 10, 2022, U.S. Provisional Application No. 63/398,202, filed on Aug. 15, 2022, U.S. Provisional Application No. 63/398,203, filed on Aug. 15, 2022, U.S. Provisional Application No. 63/377,149, filed on Sep. 26, 2022, U.S. Provisional Application No. 63/481,563, filed on Jan. 25, 2023, and U.S. Provisional Application No. 63/481,576, filed on Jan. 25, 2023, the contents of which is are herein incorporated by reference.

BACKGROUND

Industrial robotics is an expanding field for various industries that want to improve their internal and customer-facing processes. Industrial robots can be fabricated and programmed to perform various tasks for different applications. This customizability has led many enterprises to expand the incorporation of robots from manufacturing to other processes to improve the safety and the efficiency of the enterprise's workers.

BRIEF DESCRIPTION OF THE DRAWINGS

Various embodiments in accordance with the present disclosure will be described with reference to the drawings in which.

DETAILED DESCRIPTION

Figure 1:
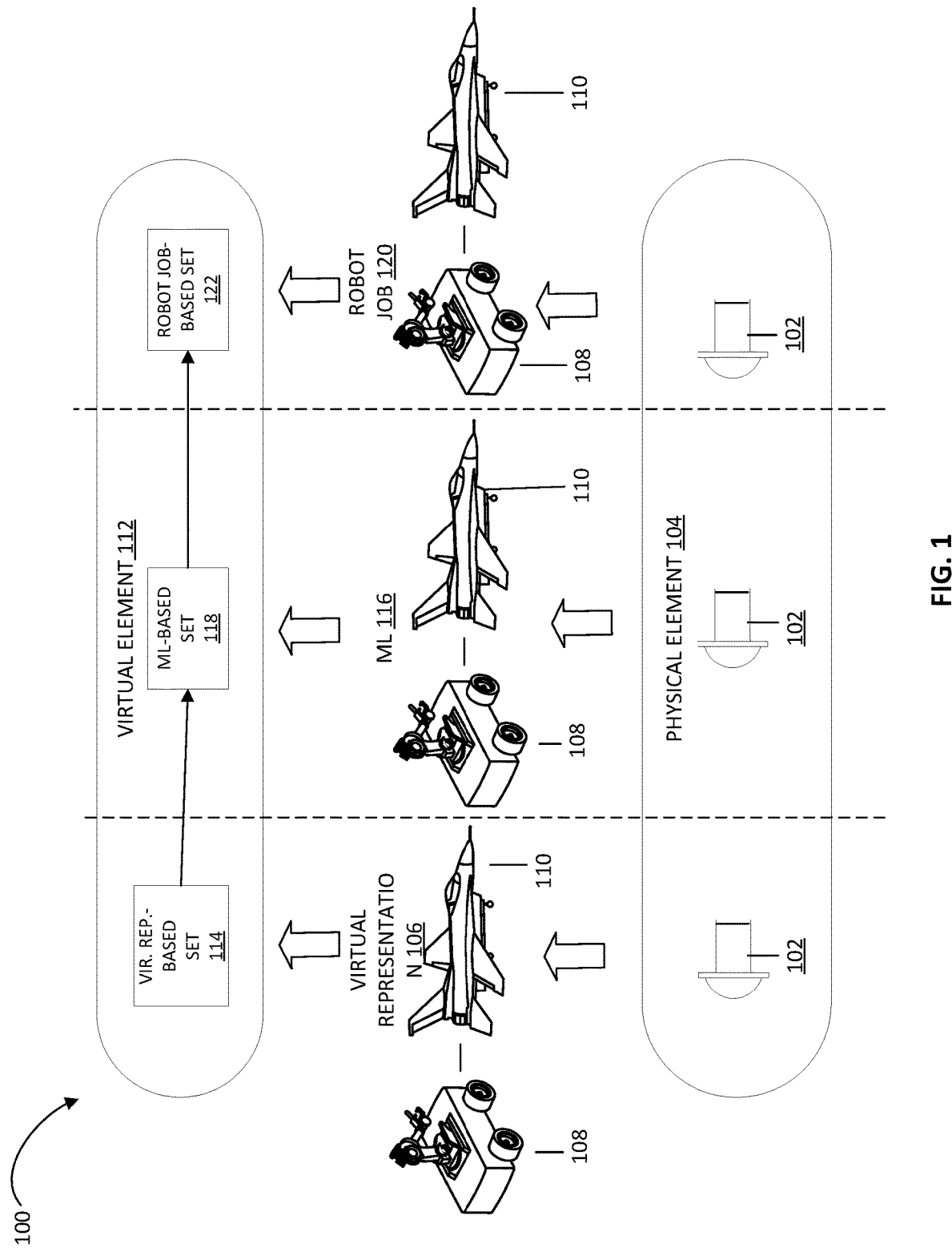
FIG. 1 is an illustration of a system for generating component-level characteristics during the maintenance cycle of an aircraft, in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Aircraft fasteners are mechanical devices that are used to assemble two or more aircraft parts into assemblies that form the aircraft. Engineers consider various factors, such as shear stress and aircraft load, when considering a type of fastener and the number of fasteners for each assembly. A fastener can vary from another fastener based on diameter, material, and shape. The fasteners are inserted into holes that are arranged through the aircraft parts. A single wing can include thousands of holes, and an entire aircraft can include hundreds of thousands of holes. As aircraft age or incur damage, the aircraft's damaged or worn part needs to be removed and replaced with new parts. This process is repeated throughout the lifespan of an aircraft. Each time that a fastener is installed, removed, or replaced, there is an opportunity for one or more fastener characteristics to change. For example, a replacement fastener may be a different fastener type than the original fastener. The replacement fastener can be drilled into the panel at a slightly different angle than the original fastener. The drilling tool used to drill in the replacement fastener can be different from the drilling tool used to drill in the original fastener.

To help preserve the integrity of the aircraft, fasteners should be installed, removed, and replaced in a structured fashion. This can include using the appropriate drilling tool, using the same or compatible fasteners, maintaining a uniform angle of insertion for the drilling tool, and other appropriate actions. The issues with this goal can be compounded with the transitioning of the job of installing, removing, and replacing fasteners from manual performance to automated performance. As aircraft servicing entities transition to robotic labor to perform these tasks, there is an increased need to record and store precise data. Furthermore, robot registration and job performance can be a multi-stage process, where fastener measurements can be taken at each stage.

Embodiments described herein address the above-referenced issues via a system that can generate fastener characteristics to be included in a digital thread. A digital thread can be a data structure that connects elements (e.g., fastener characteristics) that have traditionally been viewed distinctly. As a robot interacts with an aircraft for the performance of a job, digital information related to physical robot and aircraft elements can be collected during the performance of the job. As the robot performs a subsequent job, the digital information can be analyzed and used to support decisions related to physical elements (drilling tool type, fastener type, robot position) to perform. As the robot performs the subsequent job, digital information related to the physical elements of the job can again be collected. This digital information can be used to support decisions for a job to be performed in the future. This cycle can be repeated throughout the lifecycle of the aircraft to enable robotic maintenance of the aircraft and optimize the performance of the robot. For example, a robot can be tasked with installing a fastener to assemble an aircraft. During the job, the robot can collect digital information related to the aircraft, the aircraft section, and the fastener. A subsequent job can include the robot being tasked with removing the fastener. The robot can use the digital information collected during the fastener installation job to plan for and perform the fastener removal job. This digital information can later be used to plan for and perform a fastener replacing job by the robot. This cycle can be repeated throughout the lifecycle of the aircraft and the efficiency of which is improved through the use of the digital thread. It should be appreciated that although the above described the collection of digital information, the embodiments described herein can be applicable to the collection of analog information. For example, the robot can be tasked with gathering data to determine the structural integrity of the aircraft. In furtherance of the task, the robot can apply an Eddy current testing technique, where the Eddy current values are received as analog information.

These Eddy current values can later be converted to digital values for processing by a digital signal processor.

The embodiments described below are described with reference to fastener removal. It should be appreciated that the functionality described herein can be applied to various applications that involve a robot with an end effector that traverses the surface of a target object using a generated trajectory, such as decontamination, painting, washing, and drilling.

FIG. 1 is an illustration 100 of a system for generating component-level characteristics during the maintenance cycle of an aircraft, in accordance with one or more embodiments. As illustrated, the component relates to a fastener of an aircraft in relation to a fastener for an installing, removing, or replacing task. However, it should be appreciated that in other embodiments, the component can relate to other tasks. For example, the component can be a contaminated area of an aircraft for a decontamination job, a sensor of an aircraft for recalibration job, or other appropriate component for a robot job.

As illustrated, a fastener 102 is represented in a physical element section 104 at three stages of an installing, removal, or replacement task. A first stage can include a virtual representation stage 106. During this stage, a scan can be made of a target object to generate a multi-dimensional representation of the target object. For example, a robot 108 can scan the surface of an aircraft 110 to collect surface-related data. The scanning can be used to create a computer-aided design (CAD) file or the aircraft or a point cloud data. For example, the robot 108 can be equipped with a light detection and ranging (LiDAR) sensor that can emit a light signal and collect a signal reflected off of the aircraft 110 to create a point cloud of the aircraft 110. In practical applications, the multi-dimensional representation can be of the whole aircraft 110 or a portion of the aircraft 110.

The multi-dimensional representation can further be processed to identify digital information related to a fastener. The function can be performed locally at the robot 108 or by a computing device. The computing device can be in communication with the robot 108 or not in communication with the robot 108. To identify objects (e.g., fasteners) in the multi-dimensional representation, a clustering algorithm can be applied. For example, a Euclidean clustering algorithm can be applied to a point cloud to identify one or more clusters. Different parameters can be applied to the clusters in order to associate a cluster's datapoints to a fastener. For example, the parameters can include a minimum number of data points, a minimum distance between data points, or other appropriate data. The virtual representation-based set 114 can include digital information for a virtual representation-based set 114. For example, the virtual representation-based set 114 can include digital information related to a fastener. As illustration, it can be seen that the virtual representation-based set 114 is associated with a real-world fastener 102 at a virtual representation stage of an installation, removal, or replacement task.

The virtual representation-based set 114 can be populated with data extracted from the clustering data. The virtual representation-based set 114 can describe various characteristics of the fastener 102. For example, the virtual representation-based set 114 can include a fastener identifier, a fastener position, a drill identifier, and other appropriate information. As the fastener position can include a rigid point in free space, a position can be with respect to six degrees of freedom (6 DoF). It should be appreciated that the data is agnostic to the robot 108 and configured for the target object. In other words, the virtual representation-based set 114 is generated in the coordinate system of the aircraft 110 and not the robot 108. In this sense, another robot can retrieve the virtual representation-based set 114 and register the aircraft (e.g., determining a transformation from the coordinate system of the target object to the coordinate system of the robot).

Various methods can be used to generate the coordinate system of the aircraft 110. The coordinate system of the aircraft 110 can be used to locate one or more positions (e.g., fastener positions) on the aircraft. For example, a common points method or a fiducial marker method can be used. The fiducial markers can be placed on known positions of the aircraft 110. Based on the relative positions of the fiducial markers, the coordinate system of the aircraft 110 can be derived. The user can then move the end effector of the robot 108 (including the original robot, or any subsequent robot used to perform a task) to each of the targets, to orient the tool center point (TCP) of the end effector to each of the targets. An algorithm can then calculate measurements of a distance to the target object to be used to calculate the transformation. The application can further use the transformation for transforming a working frame of a target object to a reference frame of the robot.

In some embodiments, a user can manually adjust one or more of the fastener characteristics derived from the clustering data. For example, a user can remove a cluster associated with a fastener, or the user can relocate a cluster associated with a fastener. The user can also adjust characteristics associated with the cluster, such as drilling tool type, an image of the fastener associated with the cluster. Therefore, the virtual representation-based set 114 can further be populated with adjusted values of one or more characteristics.

The virtual representation-based set 114 can be viewed as a digital twin of the fastener 102 at a respective stage of installation, removal, or replacement task. The digital twin can be considered a virtual model that is designed to represent the bolt at a given stage of the lifecycle of the aircraft. The virtual representation-based set 114 can be arranged in a hierarchical manner to associate the fastener with a particular aircraft. For example, the virtual representation-based set 114 can include a section for identifying the aircraft 110, a section identifying a section of the aircraft 110, and a second for identifying the fastener installed at the section of the aircraft 110.

In addition to using a point cloud to cluster datapoints and associate clusters with fasteners, a system can further allow one or more machine learning models to analyze sensor-based data collected from the aircraft 110. The robot 108 can be configured to include one or more sensor-based devices. The sensor-based data can be used to generate inputs for a machine learning model (e.g., a convolutional neural network (CNN)). The machine learning model(s) can be trained to identify various fastener-related characteristics from the sensor-based data. The characteristics predicted by the machine learning models can be in addition to the characteristics derived from the clustering data or the same characteristic types. For example, it may be unlikely that a fastener head type can be derived from clustering data. However, using image data, a machine learning model can make a prediction as to the fastener head type. Additionally, sensor-based data can be used to predict characteristics identified using the clustering data. For example, a fastener position with respect to a section of the aircraft 110 can be derived from the clustering data and predicted by a machine learning model.

A second stage can include a machine learning (ML) stage 116. The ML-based set 118 can be populated with data extracted from the clustering data. The ML-based set 118 can describe various characteristics of the fastener 102 at a machine learning stage of an installation, removal or replacement task. Similar to the virtual representation-based set 114, it should be appreciated that the ML-based set 118 is agnostic to the robot 108 and configured for the aircraft 110. Therefore, another robot can retrieve the ML-based set 118 and register the aircraft to its coordinate system.

In some embodiments, a user can manually adjust one or more of the fastener characteristics derived from the sensor-based data. For example, a user can ignore a prediction by a machine learning model and replace the prediction with a user's input. For example, the user can ignore the prediction of the machine learning model to reidentify a fastener head type. Therefore, the ML-based set 118 can further be populated with adjusted values of one or more characteristics. Each of the ML-based set 118 instances can be viewed as a digital twin of the fastener 102 at a respective stage of installation, removal, or replacement task.

The virtual representation-based set 114 and the ML-based set 118 can be stored in the same data structure. For example, the data structure can be a table that includes a field for the values of the characteristics included in the virtual representation-based set 114 and the characteristic included in the ML-based set 116. As described above, the data structure can be a hierarchical data structure, in which the data structure includes multiple tables. For example, the values associated with the virtual representation-based set 114 and the values associated with the ML-based set 118 can relate to a single fastener and be stored in a first table. The first table can be linked to a second table, where the second table is associated with a section of the airplane (e.g., fuselage, wings, tail assembly, landing gear). The second table can be populated with a value that can be used to identify the aircraft section. Each aircraft section can include multiple fasteners, and therefore, the second table can be linked to multiple fastener tables. The second table can be linked to a third table associated with an aircraft. The third table can be populated with values that can be used to identify the aircraft 110. As described above, the aircraft includes multiple tables, and therefore, the third table can be linked to multiple section tables.

A third stage can include a robot job stage 120. The robot 108 can be configured to perform one or more jobs with relation to the aircraft 110. As illustrated in FIG. 1, the robot 110 can be configured to install fasteners, remove fasteners, or replace fasteners. The robot 110 can further be fitted to include one or more tools to perform the one or more jobs. For example, the robot 108 can be fitted with a drill to drill a hole in a panel to install a fastener. One or more characteristics can be collected during the performance of the robot job.

In addition to collecting data related to the target (e.g., fastener hole, fastener), during the robot job stage, tool-related data for a robot job-based set 122 can be collected. For example, a tool identifier, a trajectory, or a time of performance value, for the robot job, can be received directly from the robot 108 as it is performing the job. The values received by the robot can be in addition to the characteristics derived from the clustering data, machine learning predictions, or the same characteristic types. In some instances, the values are complementary to the values derived from the clustering data or machine learning predictions. For example, the position of a hole or fastener or a hole in free space can be derived from the clustering data or machine learning predictions. Additionally, the position of a robotic tool can be received from the robot 108. The position and trajectory of the tool as it approaches the hole or fastener should result in the positions of the tool converging towards the position of the hole/fastener in free space.

In some embodiments, a user can manually adjust one or more of fastener characteristics received from the robot 108. For example, a user can ignore a value received from the robot 108 and replace the value with a user's input. For example, the user can ignore the robot's indication that tool has a serial number "x" and replace the serial number with "y". Therefore, the robot job-based set 122 can further be populated with adjusted values of one or more characteristics. The robot job-based set 122 instance can be viewed as a digital twin of the fastener 102 at a respective stage of installation, removal, or replacement task.

A maintenance task performed by the robot 108 on the aircraft 110 can include the three stages, virtual representation, ML-based identification, and robot job. Furthermore, a virtual representation-based set 114, an ML-based set 118, and a robot job-based set 122 can be respectively collected at each state. Each of the sets can be linked to a maintenance instance. Throughout the lifecycle of the aircraft 110, each successive maintenance instance can include a virtual representation-based stage, an ML-based stage, and a robot job-based stage. Each of the data sets collected at each of the stages for each maintenance instances can be linked to this form the digital thread.

The values stored in the digital thread can be used to perform analytics for not only optimizing the robot's performance, but predictive analytics related to the aircraft. For example, consider an example in which the aircraft 110 has undergone three maintenance sessions. In each session, at least one fastener has been drilled out by the robot 108 and replaced by a new fastener. The aircraft 110 can now be scheduled for a fourth maintenance, in which the fastener is again scheduled to be drilled out and replaced by a new fastener. The values collected from one or more of the previous robot job-based sets can be retrieved. Furthermore, the position and trajectory of the robot tool from the previous robot job-based set can be compared to a value of a position of the fastener from the current virtual representation-based set 114 or the ML-based set 118. As no maintenance should have been performed between the last of the previous three maintenance sessions and the current fourth maintenance session, the position and trajectory of the robot tool from the previous robot job-based set should converge with the detected position of the fastener from the current virtual representation-based set 114 or the ML-based set 118. If the position and trajectory of the robotic tool and the fastener position do not converge, an error can be reported.

In addition to the robot performance, the values can be used for analytics related to the aircraft 110. For example, the values can be used for predictive analytics used to assess the health (e.g., integrity) of the aircraft 110. For example, as described above, the position of the fasteners on the aircraft 110 are not static, and over time one or more fastener positions can shift. The shifting of the fastener in an aircraft section panel can affect the structural integrity of the panel, and as a result, the aircraft. Therefore, modeling techniques can be applied that take the position values of the holes/fasteners over time and determine whether a shift in the position has affected the structural integrity of the aircraft 110.

The virtual representation-based set 114, the ML-based set 118, and the robot job-based set 122 can be stored in the same data structure. For example, the data structure can be a table that includes fields for the values of the characteristics included in the virtual representation-based set 114, the ML-based set 116, and the robot job-based set 122. As described above, the data structure can be a hierarchical data structure, in which the data structure includes multiple tables. For example, the values associated with the virtual representation-based set 114, the ML-based set 118, and the robot job-based set 122 can relate to one or more tools and a single fastener and be stored in a first table. The first table can be linked to a second table, where the second table is associated with a section of the airplane (e.g., fuselage, wings, tail assembly, landing gear). The second table can be populated with that can be used to identify the aircraft section. Each aircraft section can include multiple fasteners, and therefore, the second table can be linked to multiple fastener tables. The second table can be linked to a third table associated with an aircraft. The third table can be populated with values that can be used to identify the aircraft 110. As described above, the aircraft includes multiple tables, and therefore, the third table can be linked to multiple section tables.

Figure 2:
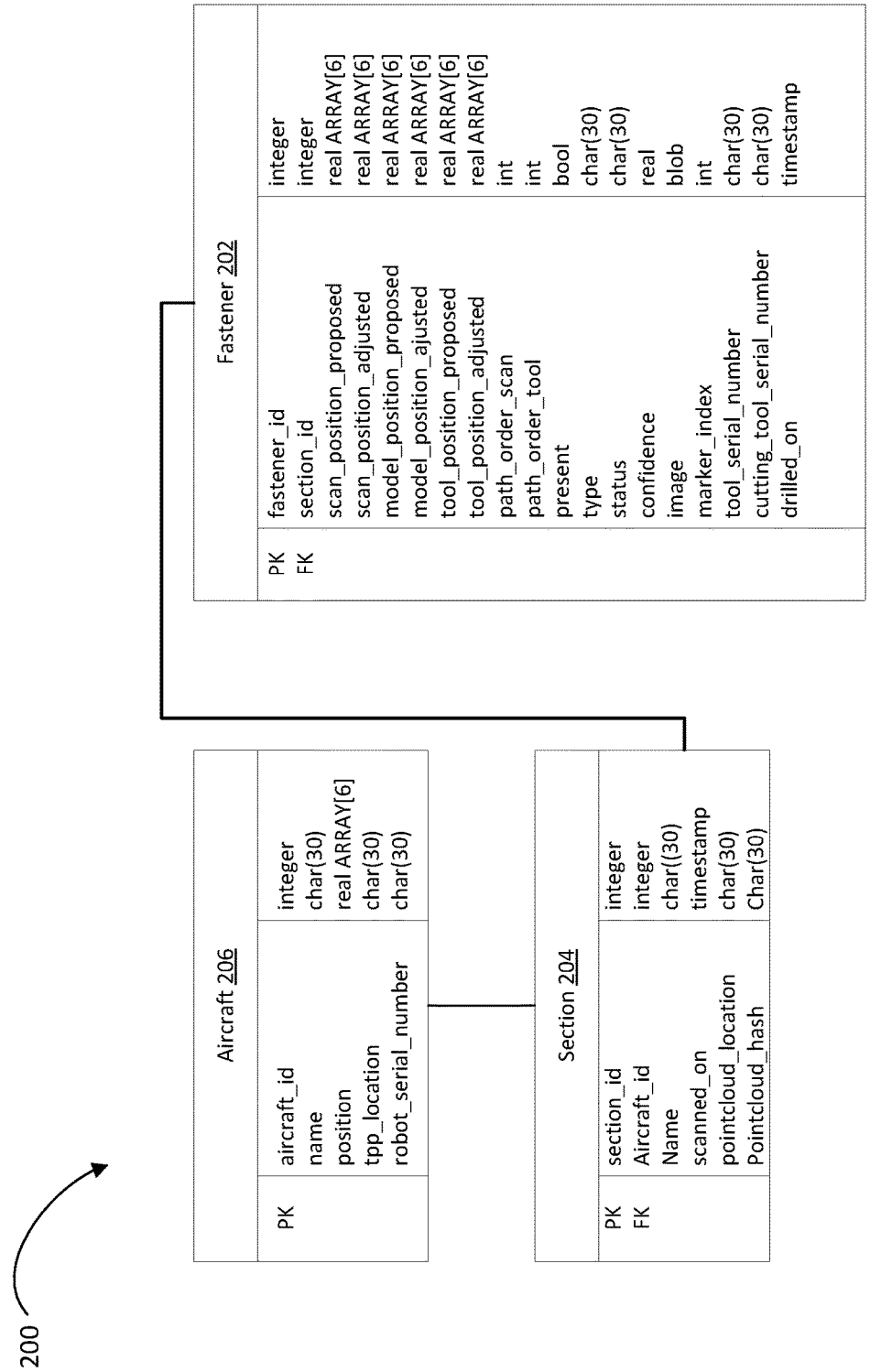
FIG. 2 is an illustration of a database for stored fastener-based information of an aircraft, according to one or more embodiments.

FIG. 2 is an illustration 200 of a database for stored fastener-based information of an aircraft, according to one or more embodiments. As illustrated, the data structure can include a fastener table 202, a section table 204, and an aircraft table 206. Each of a fastener table 202, a section table 204, and an aircraft table 206 can include values obtained during a lifecycle of an aircraft. For example, the values can be obtained during a maintenance session for the aircraft, where the maintenance session includes a virtual representation stage, an ML stage, and a robot job stage. As described above, an aircraft includes multiple sections, and each section can include multiple fasteners. Therefore, it should be appreciated that the aircraft table 206 can be linked to multiple section tables, and each section table can be linked to multiple fastener tables. It should be appreciated that FIG. 2 is an example of a fastener-based database. In practice, there can be a number of different data structures. In one example, a database includes a total of three tables, in which case the first table is a fastener table, the second table is a section table, and the third table is an aircraft table. These three tables are described herein for illustrative purposes. A different number of tables can be used, such as four or more. Other data structures representing any type of schema are also possible.

The fastener table 202 can include values that describe a fastener that is, or at one time was, installed in an aircraft. The fastener table 202 can be associated with the section table 204 and the aircraft table 206 via a primary key (PK) and a foreign key (FK). The PK and the FK can form relationships between the tables and can be used as the basis for forming queries against the tables. The PK can be a column value in the fastener table 202 that can be used to ensure that the data is unique. For example, the fastener table 202 can include a PK to ensure that the values are unique to a fastener. The FK can be a column value that associates a table with another table. For example, the FK of the fastener table 202 can be the PK of the section table 204.

The PK can include a fastener identifier (fastener id), that is a unique identifier of a fastener. The fastener identifier can be an integer value. The FK can include a section identifier (section_id), that is a unique identifier of a section that includes the fastener. The section identifier can be an integer value. The fastener table 202 can include a proposed scan position (scan_position_proposed), which can include a position of the fastener derived during a virtual representation stage. The value can include an array of values that describe the position of the fastener with respect to the aircraft coordinate system. The fastener table 202 can include an adjusted scan position (scan_position_adjusted), which can include a position of the fastener after manual adjustment by a user during a virtual representation stage. The value can include an array of values that describe the position of the fastener with respect to the aircraft coordinate system. The fastener table 202 can include a proposed model position (model_position_proposed), which can include a position of the fastener derived during an ML stage. The value can include an array of values that describe the position of the fastener with respect to the aircraft coordinate system. The fastener table 202 can include an adjusted model position (model_position_adjusted), which can include a position of the fastener after manual adjustment by a user during an ML stage. The value can include an array of values that describe the position of the fastener with respect to the aircraft coordinate system. The fastener table 202 can include a proposed tool position (tool_position_proposed), which can include a position of the fastener derived during a robot job stage. The value can include an array of values that describe the position of the fastener with respect to the aircraft coordinate system. The fastener table 202 can include an adjusted tool position (tool_position_adjusted), which can include a position of the fastener after manual adjustment by a user during a robot job stage. The value can include an array of values that describe the position of the fastener with respect to the aircraft coordinate system.

The fastener table 202 can include a path scanning order (path order scan), which can be an integer value. The path scanning order can be an order by which the tool scans the fasteners installed in the section. For example, an optimization algorithm, such as a traveling salesman problem (TSP) algorithm, can be used to determine an optimal order by which a robot tool can scan each fastener on a section of an aircraft. The path scanning order can be obtained during the robot stage. The fastener table 202 can include path order tool identifier (path order tool), which can be an integer value for an identifier of the tool used to scan the surface of the section. The path order tool identifier can be obtained during the robot stage.

The fastener table 202 can include a present field (present), which can be a Boolean value describing whether the fastener was either present or not present in the section. The fastener table 202 can include a type field (type), which can be a character string describing the type of fastener. The fastener type can be obtained during the ML stage. The fastener table 202 can include a status field (status). The status field can include a character string describing a status of the fastener (e.g., to remain, to be replaced, structurally intact, damaged). The fastener table 202 can include a confidence field (confidence), which can include a real number described a confidence level that the information describing the fastener is accurate. The fastener table 202 can include an image field (image), which can be in a binary large object (BLOB) format, and can include an image of the fastener. The fastener image can be obtained during the ML stage or the robot job stage.

The fastener table 202 can include a marker index (marker index), which can be an integer value describing a marker used to generate the coordinate system of the aircraft. The fastener table 202 can include a tool serial number (tool_serial_number), which can be a character string that provides an identifier of a tool used by a robot. The tool serial number can be obtained during the robot job stage. The fastener table 202 can include cutting tool serial number (cutting_tool_serial_number), which can be a character string that describes a cutting tool used by the robot. The cutting tool serial number can be obtained during the robot job stage. The fastener table 202 can include a drilled on field (drilled on), which can include a timestamp that the robot performed an operation on the fastener. It should be appreciated that the above-described values are associated with installing, removing, and replacing a fastener. In the event that the robot is tasked with another job, the values can be associated with the other job.

The section table 204 can include a PK, which can be a unique identifier for the section that can be the FK for the fastener described in the fastener table 202. The section table can further include an FK, which can be the PK of the aircraft table 206. The PK can include a section identifier (section_id), which can be an integer value that is the same as the section identifier of the fastener table 202. The section table 204 can include an aircraft identifier (aircraft_id), which can be an integer value that identifies the aircraft that includes the section. In some instances, the aircraft identifier can include a tail number of the aircraft. The section table 204 can include a name field (name), which can be a character string that identifies the section (e.g., fuselage, left wing, right wing, tail assembly, landing gear). The section table 204 can include a time scanned on field (scanned_on), which can be a timestamp for when the section was scanned. The time scanned on field can be obtained during the virtual representation stage. The section table 204 can include a point cloud location field (pointcloud_location), which can include character string describing the file path of the section with respect to the point cloud. The point cloud location field can be obtained during the virtual representation stage. The section table 204 can include a point cloud hash field (pointcloud_hash), which can be a character string used to secure the contents of the point cloud. A user can create a password and hash the password using a salt. The hash can be stored in the section table. In the event that the user relogs on and uses the password, the password is resalted to determine if the outputted hash is the same as the stored hash in the point cloud hash field. If the hashes match, the user is permitted to continue accessing the data. If the hashes do not match, the user is provided an error message, and not permitted to access the data.

The aircraft table 206 can include a PK, which can be a unique identifier for the aircraft that includes the section and the fastener. The PK can be an aircraft identifier (aircraft_id), which can be the same as the aircraft identifier of the section table 204. The aircraft table 206 can include a name field (name), which can be a character string that includes the name of the aircraft. The name field can be different than the name field of the section table 204. The aircraft table 206 can include a tpp location field (tpp_location), which can be a character string describing where on the aircraft that the robot performed an operation. The aircraft table 206 can further include a robot serial number field (robot_serial_number), which can be a character string describing which robot performed the operation.

During the lifecycle of the aircraft, multiple maintenance sessions can be performed. Therefore, the aircraft table 206 can not only be linked to multiple section tables and multiple fastener tables based on the identities of the sections and fasteners, but the aircraft table 206 can be linked to multiple section tables and fastener tables based on time of operation. For example, the aircraft table 206 can be linked to a section table associated with a scanning date of _____, but also a section table associated with a scanning date of _____. The aircraft can be linked to multiple section tables based on time, even if each of the tables relate to the same section. Consequently, a section table can be linked to multiple fastener tables based on fastener identities and time. For example, the section can be linked to a fastener associated with a drilling on date of _____, but also a fastener associated with a drilled on date of _____. The section can be linked to multiple fasteners based on time.

Figure 3:
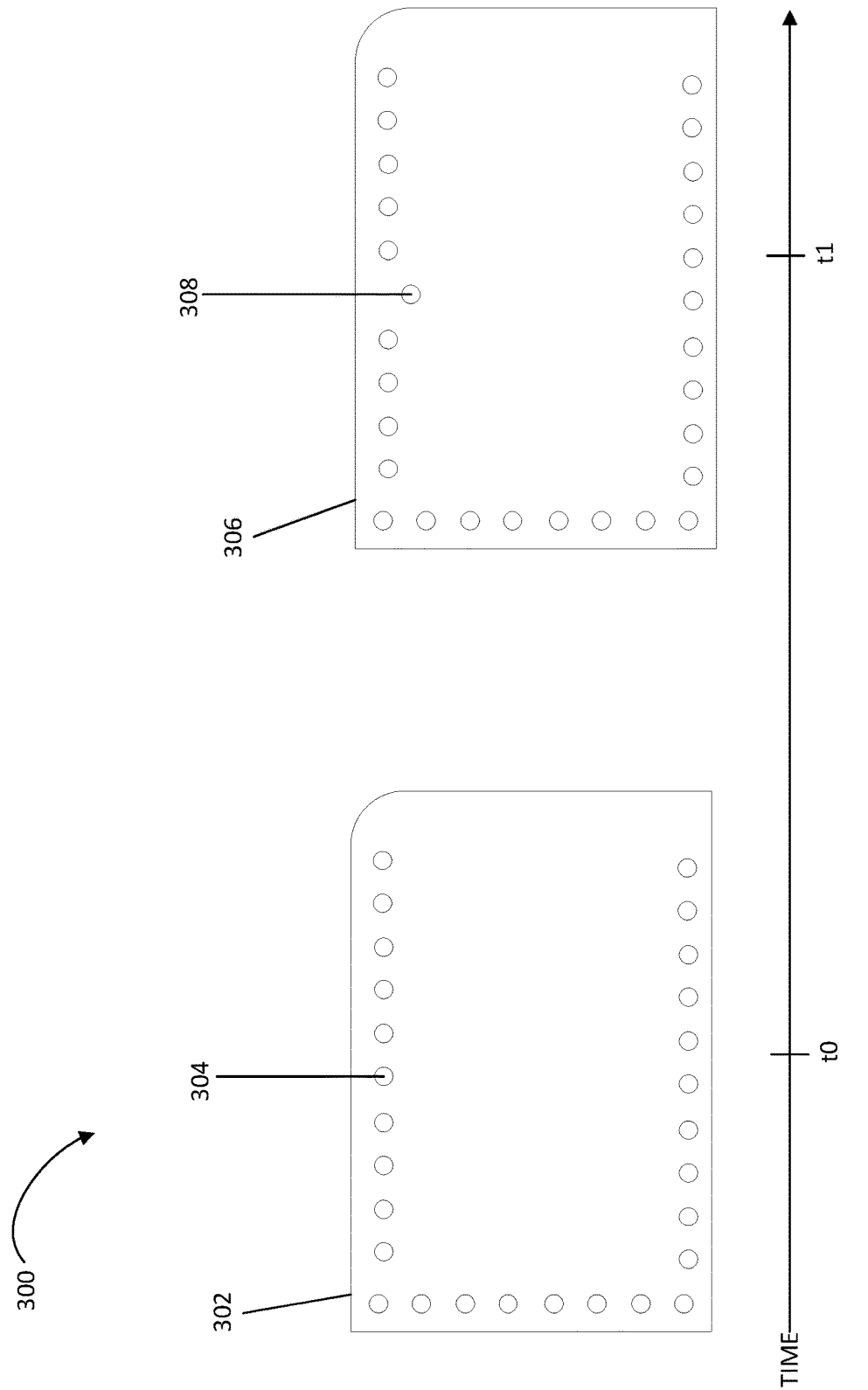
FIG. 3 is an illustration of an aircraft panel and fasteners, according to one or more embodiments.

FIG. 3 is an illustration 300 of an aircraft panel and fasteners, according to one or more embodiments. FIG. 3 is provided to illustrate the concept that fasteners do not remain in static positions on the surface of the aircraft. Furthermore, one having ordinary skill in the art can imagine various scenarios of changes to fastener arrangement than are illustrated herein. A first panel 302 illustrated at a first time ($t_0$), includes a series of fasteners arranged along a contour of the panel 302. For illustrative purposes a fastener 304 is illustrated as being arranged linearly with a set of fasteners. A second panel 306 is illustrated at a second time ($t_1$), also includes a series of fasteners. The second panel 306 can be a replacement panel for the first panel 302. The first panel 302 can have been replaced by the second panel 306 at some point between the first time ($t_0$) and the second time ($t_1$). For various reasons, a fastener 308 can be arranged on the panel 306 in a non-linear fashion with the surrounding fasteners. In other words, the positioning of the fastener on the second panel does not align with the positioning of the fastener on the second panel 306.

The herein described embodiments address this issue by providing a digital thread that tracks the current positioning of the fasteners to the aircraft. As described above, the robot can be configured to follow a path to traverse each of the fasteners on a section. The path may or may not be optimal if one or more of the fasteners have changed position. Therefore, as the robot is collecting position information during a virtual representation stage and an ML stage, the relative positions of the fasteners can be compared to previously determined positions of fasteners. The comparisons can assist an algorithm executing on the robot or a server as to whether to calculate a new path or reuse a previously calculated path. Other uses for detecting fastener positions can include determining a structural integrity of aircraft based on the impact a fastener or combination of fasteners can impose on a panel.

Figure 4:
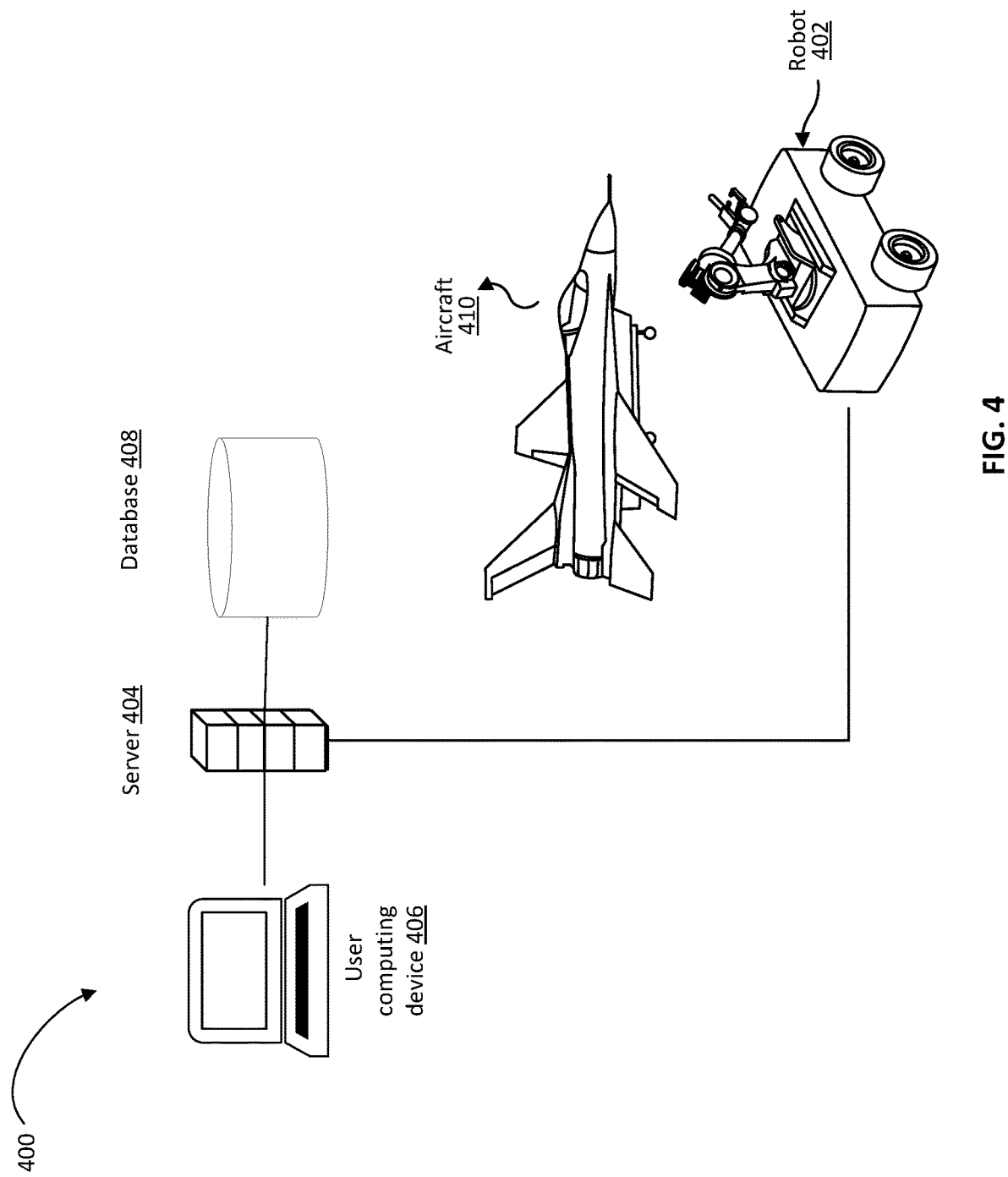
FIG. 4 is an illustration of an environment for a fastener-based database used to guide robotic operations, in accordance with one or more embodiments.

FIG. 4 is an illustration of an environment 400 for fastener-based database used to guide robotic operations, in accordance with one or more embodiments. The environment 400 can include a robot 402, a server 404 in operable communication with a user computing device 406 and a database 408. The robot 402 can be in operable communication with the server 404 that, in turn, can be in operable communication with the user computing device 406 and the database 408. The server 404 can include one or more computing devices configured to support the robot 402. The server 404 can be located at the same premises as the robot 402, or the server 404 can be located remotely on another premises from the robot 802. Additionally, the database 408 can be stored on the server 404, or the database 408 can be stored on a computing device external to the server 404.

The database 408 can store a digital thread in the form of a data structure that holds fastener-based information. In particular, the database 408 can store information related to aircraft fasteners over the lifecycle of the aircraft 410. The database 408 can store the information and can provide a time-based multi-dimensional mapping of fasteners installed on the aircraft. For example, the database 408 can provide a multi-dimensional mapping of the fasteners taken when the aircraft was initially assembly. The database 408 can further provide a current multi-dimensional mapping of the fasteners on the aircraft 410.

The database 408 can be triggered to update based on various triggers. For example, in each instance that the robot 402 is tasked with performing a job, the server 404 can transmit control instructions for the database 408 to create a new instance of a fastener. The server 404 can further transmit control instructions to link the new fastener table entry to the section table using an FK, which can be the same value as the PK of the section table.

A user can engage with the user computing device 406 to transmit messages to and from the server 404, which can, in turn, transmit and receive messages to and from the database 408 and the robot 402. The robot 402, the server 404, the database 408 and the user computing device 406 can be configured to permit the robot to perform autonomous operations on an aircraft 410 and or parts thereof or another real-world object. The autonomous operations can include, for example, removing, replacing or installing fasteners for the aircraft 410, decontamination of the aircraft 410, and painting the aircraft 410. It should be appreciated that as illustrated, the user computing device 406 can communicate with the robot 402 via the server 404. In other embodiments, the user computing device 406 can communicate directly with the robot 402, and further the user computing device 406 performs the below described functionality of the server 404.

In addition, the user can use the user computing device 406 to provide instructions to the robot 402, a user can use the user computing device to adjust the values of the database. As indicated above, the position data collected at the virtual representation stage, the ML stage and the robot job stage can be manually adjusted by a user. The user can user the user computing device 406 to view the location characteristic. For example, the user can access a user interface (UI) configured to display the aircraft table, the section table and the fastener table. The user can then use the UI to modify one or more values of the aircraft table, the section table and the fastener table.

The robot 402 can navigate to the operational area and, once thereat, perform a set of operations to register the aircraft 410 (or a part thereof) to then perform another set of operations on the aircraft 410 (and/or the airplane part). Some of these operations can be computationally expensive (e.g., a feature identification phase, registration phase, path and trajectory generation phase), whereas other operations can be less computationally expensive and more latency sensitive (e.g., drilling a fastener hole operation). The computationally expensive operation(s) can be offloaded to the server 404, whereas the remaining operation(s) can be performed locally by the robot 402. In either case, the robot 402 or the server 404 can access one or more values from the database 408 to perform these operations. For example, the robot 402 or the server 404 can retrieve location information from the library to calculate a path to traverse the surface of the aircraft 410. Additionally, the robot 402 or the server 404 can retrieve location information from the database 408 to calculate, using inverse kinematics, a trajectory for the robot 402 to follow to reach each fastener. As described above, the library can store values in the coordinate system of the aircraft 410. Therefore, in order to use the values, the robot 402 or the server 404 can calculate a transformation to translate the coordinate system of the aircraft to the coordinate system of the robot 402. Once the different operations are completed, the robot 402 can autonomously return to a parking area or can be summoned to another operational area.

In an example, a robot 402 can include a movable base, a power system, a powertrain system, a navigation system, a sensor system, a robotic arm, an end effector, input and output (I/O) interfaces, and a computer system. The end-effector can support a particular autonomous operation (e.g., drilling) and can be a line-replaceable unit with a standard interface, such that the end-effector can be replaced with another one that supports a different autonomous operation (e.g., sealing). The end-effector replacement can be carried by the robot 402 itself or can use a manual process, where an operator can perform the replacement. The I/O interfaces can include a communication interface to communicate with the server 404, the user computing device 406, and the database 408 for selection of autonomous operations to be performed by the robot 802. The computer system can include one or more processors and one or more memory storing instructions that, upon execution by the one or more processors, configure the robot 802 to perform different operations. The instructions can correspond to program codes for the navigation, controls of the power system, controls of the powertrain system, the collection and processing of sensor data, the controls of the robotic arm, the controls of the end effectors, and/or the communications.

The robot 402 can include light detection and ranging (LiDAR) sensors to emit a pulsed laser towards the aircraft 410. The LiDAR sensors can further be configured to collect reflected signals from the aircraft 410. The LiDAR sensors can determine an angle of reflection of the reflected signal and a time elapse (time-of-flight) between transmitting the signal and receiving a reflected signal to determine a position of a reflection point on the surface of the aircraft 810 relative to the LiDAR sensors. The robot 402 can continuously emit laser pulses and collect reflection signals. The robot 402 can transmit the sensor data to the server 404, which can further generate a point cloud of the aircraft 410. The database 408 can further populate a data structure using values derived from the point cloud. In other instances, the server 404 can retrieve a stored point cloud of the aircraft 410 from the database 408.

The server 404 can be a hardware computer system that includes one or more I/O interfaces to communicate with the robot 402, the user computing device 406, and the database 408. The server 404 can further include one or more processors, and one or more memory storing instructions that, upon execution by the one or more processors, configure the server 404 to perform different operations. The instructions can correspond to program codes for the communications and for processes to be executed locally on server 404 for the robot 402 given data sent by the robot 402.

The user computing device 406 can be a hardware computer system that includes one or more I/O interfaces to communicate with the server 404 and with the robot 402. The user computing device can further include one or more input interfaces (e.g., a mouse, a keyboard, a touch screen) for receiving user inputs.

The database 408 can be a computing system that includes one or more I/O interfaces to communicate with the server 404 and with the robot 402. The database 408 can further be configured to store a digital thread that holds fastener-based values associated with the aircraft 410, and over the lifecycle of the aircraft 410.

In response to one or more inputs, multiple operations may be needed to be performed and inter-dependencies between these operations may exist. For instance, to identify fasteners and/or drill fastener holes on an aircraft 410, the robot 402 can detect targets (e.g., fasteners), register the aircraft 410 so that it can be located in a local coordinate system of the robot 402, control the robotic arm to move to the locations according to a particular trajectory, and control the end effector to drill. Some of the operations can be computationally expensive and performed less frequently (e.g., generating a simultaneous localization and mapping (SLAM) map, registration), whereas other operations can be computationally less expensive but latency sensitive and performed more frequently (e.g., controlling the robotic arm and end effector). As such, the server 404 can execute processes for the computationally expensive/less frequently performed operations, whereas the robot 402 can locally execute processes for the remaining operations.

In some instances, a user can select one or more inputs for controlling the robot 402. The user computing device 406 can receive the inputs and transmit a message including the inputs to the server 404. The server can include an application for performing one or more operations to control the robot 402. The server 404 can receive and transmit messages to and from the robot 402. For the local operations, the robot 402 can execute the corresponding processes locally and can inform the server 404 of the results of these local operations (e.g., that a fastener hole was drilled at a particular location on the aircraft 410). The server 404 can transmit a message to the user computing device 406.

Figure 5:
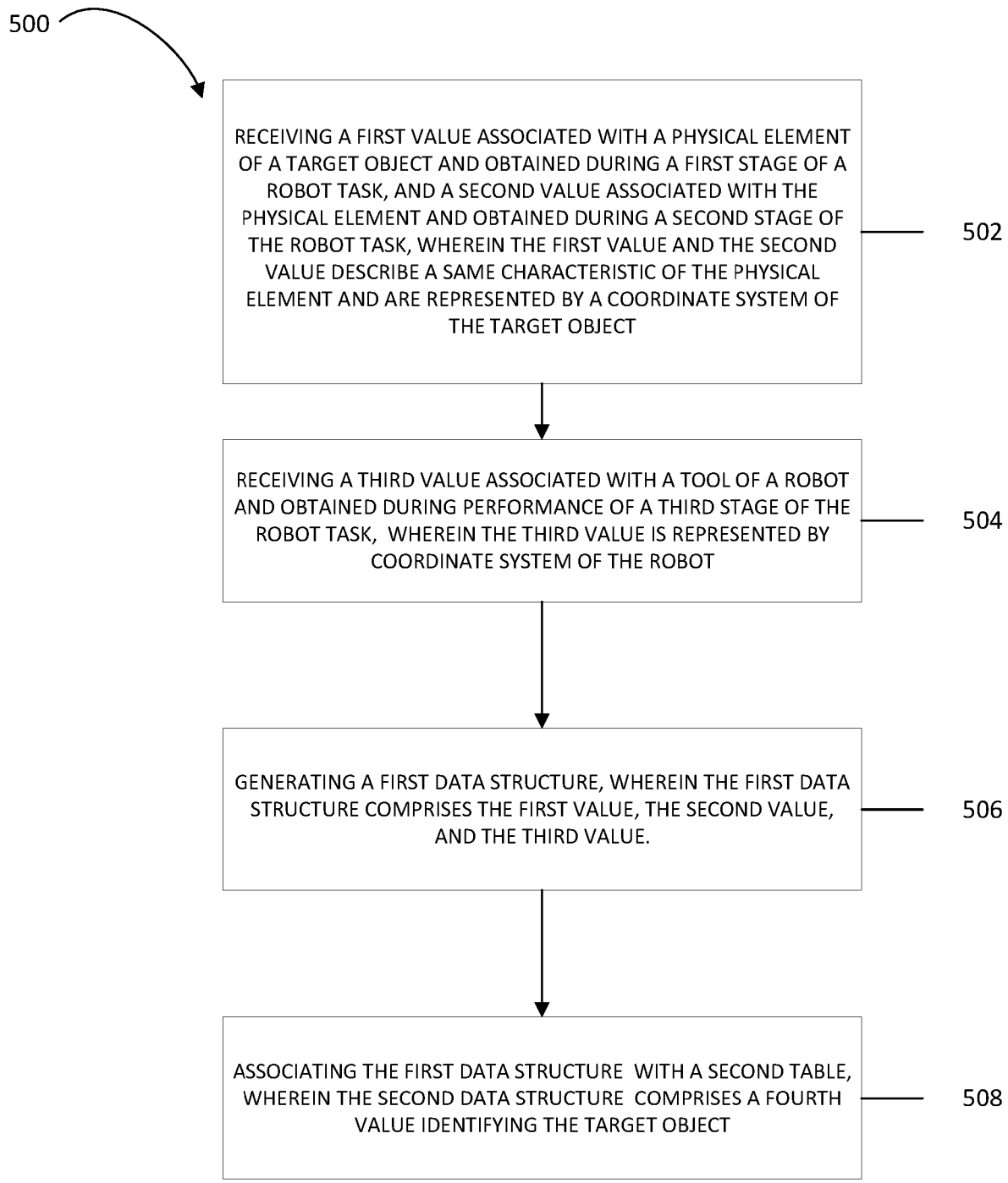
FIG. 5 is a process flow for generating a database with fastener-based values, according to one or more embodiments.

FIG. 5 is a process flow 500 for generating a library of fastener-based values, according to one or more embodiments. At 502, a method can include a computing device receiving a first value associated with a physical element of a target object and obtained during a performance of a first stage of a robot task, and a second value associated with the physical element and obtained during the performance of a second stage of the robot task, wherein the first value and the second value describe a same characteristic of the physical element and are represented in a coordinate system of the target object. The first value can be a location of a fastener in the coordinate system of an aircraft. The first value can be derived during a virtual representation stage of a maintenance task on the aircraft. The first value can further be generated from a point cloud of the aircraft. The second value can also be a location of a fastener in the coordinate system of the aircraft. The first value can be derived during a machine learning stage of the maintenance task on the aircraft. The second value can further be generated from an output of a machine learning algorithm.

At 504, the method can include the computing device receiving a third value associated with a tool of a robot and obtained during performance of a third stage of the robot task, wherein the third value is represented in the coordinate system of the robot. The third value can be a location of a robotic tool, such as a drill during the performance of the robotic task.

At 506, the method can include the computing device generating an element in a first data structure, such as a fastener table, wherein the element comprises the first value, the second value, and the third value. The element can be an entry in the fastener table that can digitally represent the fastener at a given point in time.

At 508, the method can include the computing device associating the fastener table with a second data structure, such as a second table, wherein the second data structure comprises a fourth value identifying the target object. The second data structure can be a section table. An element from the first data structure can be associated with an element from the second data structure via a primary key (PK) and a foreign key (FK). The data structure can include a foreign key that can be a section identifier. The second data structure can include a primary key (PK) that can be the same section identifier. A user can perform a query to retrieve data from the first data structure belonging to an element in the second data structure by entering the primary key of the element of the second data structure.

Figure 6:
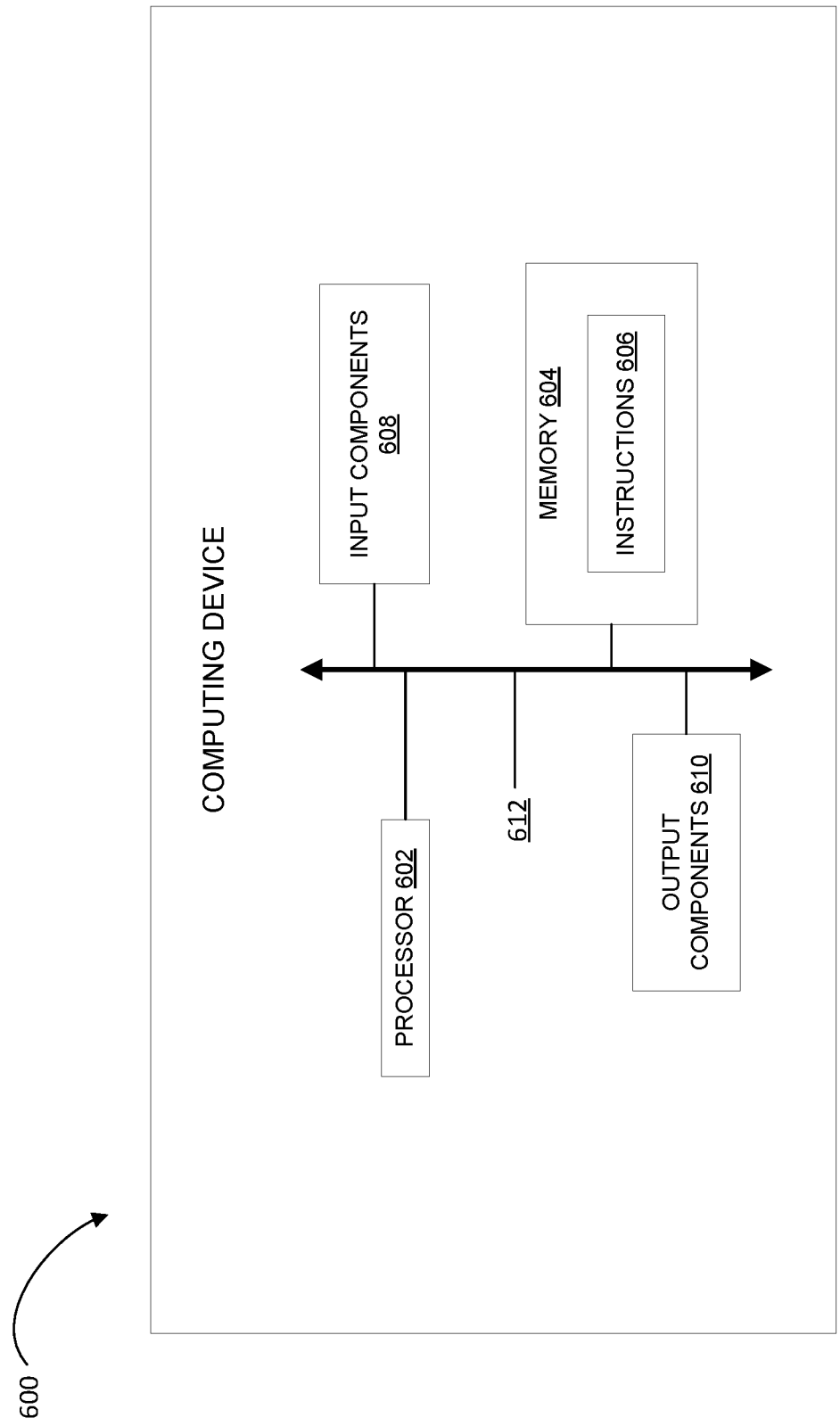
FIG. 6 is a block diagram of an example of a computing device, in accordance with one or more embodiments.

FIG. 6 is a block diagram of an example of a computing device 600 usable for implementing some aspects of the present disclosure. The computing device 600 includes a processor 604 coupled to a memory 604 via a bus 612. The processor 602 can include one processing device or multiple processing devices. Examples of the processor 602 include a Field-Programmable Gate Array (FPGA), an application-specific integrated circuit (ASIC), a microprocessor, or any combination of these. The processor 602 can execute instructions 606 stored in the memory 604 to perform operations. In some examples, the instructions 606 can include processor-specific instructions generated by a compiler or an interpreter from code written in any suitable computer-programming language, such as C, C++, C #, Python, or Java.

The memory 604 can include one memory device or multiple memory devices. The memory 604 may be non-volatile and include any type of memory device that retains stored information when powered off. Examples of the memory 604 can include electrically erasable and programmable read-only memory (EEPROM), flash memory, or any other type of non-volatile memory. At least some of the memory 604 includes a non-transitory computer-readable medium from which the processor 602 can read instructions 606. A computer-readable medium can include electronic, optical, magnetic, or other storage devices capable of providing the processor 602 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 606.

The computing device 600 may also include other input and output (I/O) components. The input components 608 can include a mouse, a keyboard, a trackball, a touch pad, a touch-screen display, or any combination of these. The output components 610 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computing system, point cloud data associated with a first fastener of a target object and generated by a robot during performance of a first stage of a first robot task;
   determining, by the computing system, a first value associated with the first fastener of the target object based at least in part on the point cloud data, the first value describing a first characteristic of the first fastener;
   receiving, by a computing system, sensor data associated with the first fastener of the target object and collected by the robot during performance of a second stage of the first robot task;
   generating, by the computing system and using a machine learning model, a second value associated with the first fastener based at least in part on the sensor data, the second value comprising a prediction of a machine learning model, the second value describing the first characteristic of the first fastener, the first value and the second value represented in a coordinate system of the target object;
   receiving, by the computing system, a third value associated with a tool of a robot and obtained during performance of a third stage of the first robot task, wherein the third value is received from the robot, wherein the third value is represented in the coordinate system of the robot;
   generating, by the computing system, a first data structure, wherein the first data structure comprises the first value, the second value, and the third value; and
   associating, by the computing system, the first data structure with a second data structure, wherein the second data structure comprises a fourth value identifying the target object.

2. The method of claim 1, wherein the method further comprises:
receiving a fourth value comprising a first timestamp of performance of the third stage of the first robot task; and
populating the first data structure with the fourth value, wherein the first data structure comprises a digital representation of the first fastener at a first time indicated by the first time stamp, and wherein the first value and the second value respectively describe a location of the first fastener on the target object at the first time indicated by the first time stamp.

3. The method of claim 2, wherein the method further comprises associating the first data structure to a third data structure, wherein the third data structure comprises a digital representation of the first fastener at a second time indicated by a second time stamp, and wherein the first time and the second time occur during a life cycle of the target object.

4. The method of claim 1, wherein associating the first data structure and the second data structure comprises storing a foreign key (FK) in the first data structure and storing a primary key (PK) in the second data structure, wherein the foreign key (FK) matches the primary key (PK).

5. The method of claim 4, wherein the primary key (PK) is a first fastener identifier, and the foreign key (FK) is a target object identifier.

6. The method of claim 1, wherein the method further comprises:
receiving a query, from a server, for the first value, wherein the query comprises a first fastener identifier;
identifying the first data structure based on a primary key (PK) of the second data structure and the first fastener identifier, wherein the primary key (PK) of the second data structure is a foreign key (FK) of the first data structure; and
retrieving the first value from the first data structure based on the identification; and
transmitting the first value to the server.

7. A computing system, comprising:
a processor; and
a computer-readable medium including instructions that, when executed by the processor, cause the processor to perform operations comprising:
receiving point cloud data associated with a first fastener of an aircraft and generated by a robot during performance of a first stage of a first robot task;
determining a first value associated with the first fastener of the aircraft based at least in part on the point cloud data, the first value describing a first characteristic of the first fastener;
receiving sensor data associated with the first fastener of the aircraft and collected by the robot during performance of a second stage of the first robot task;
generating, using a machine learning model, a second value associated with the first fastener based at least in part on the sensor data, the second value comprising a prediction of a machine learning model, the second value describing the first characteristic of the first fastener, the first value and the second value represented in a coordinate system of the aircraft;
receiving a third value associated with a tool of a robot and obtained during performance of a third stage of the first robot task, wherein the third value is represented in the coordinate system of the robot;
generating a first data structure, wherein the first data structure comprises the first value, the second value, and the third value; and
associating the first data structure with a second data structure, wherein the second data structure comprises a fourth value identifying the aircraft.

8. The computing system of claim 7, wherein the instructions that, when executed by the processor, further cause the processor to perform operations comprising:
receiving a fourth value comprising a first timestamp of performance of the third stage of the first robot task; and
populating the first data structure with the fourth value, wherein the first data structure comprises a digital representation of the first fastener at a first time indicated by the first time stamp, and wherein the first value and the second value respectively describe a location of the first fastener on the aircraft at the first time indicated by the first time stamp.

9. The computing system of claim 7, wherein the first data structure is a first fastener table, wherein the first fastener table comprises a first fastener identifier, a location of the first fastener in the coordinate system of the aircraft, and a first fastener type.

10. The computing system of claim 7, wherein the second data structure is a section table and wherein the section table comprises a fuselage, wing, tail assembly, or landing gear.

11. The computing system of claim 8, wherein the instructions that, when executed by the processor, further cause the processor to perform operations comprising associating the first data structure to a third data structure, wherein the third data structure comprises a digital representation of the first fastener at a second time indicated by a second time stamp, and wherein the first time and the second time occur during a life cycle of the aircraft.

12. The computing system of claim 11, wherein the third data structure is an aircraft table, wherein the aircraft table comprises an aircraft identifier and a robot identifier.

13. The computing system of claim 7, wherein the first robot task comprises removal of the first fastener from the aircraft, wherein a second robot task comprises installation of a second fastener in the aircraft, wherein the second robot task is performed based on the first value, and wherein the instructions that, when executed by the processor, further cause the processor to perform operations comprising:
receiving a fifth value associated with second fastener and obtained during a performance of a first stage of the second robot task, and a sixth value associated with the second fastener and obtained during performance of a second stage of the second robot task, wherein the first value and the second value describe a same characteristic of the second fastener and are represented in a coordinate system of the aircraft;
receiving a seventh value associated with a tool of a robot and obtained during performance of a third stage of the second robot task, wherein the third value is represented in the coordinate system of the robot;
generating a fourth data structure, wherein the fourth data structure comprises the fifth value, the sixth value, and the seventh value; and
associating the fourth data structure with a fourth data structure.

14. A computer-readable medium having stored thereon a sequence of instructions which, when executed, causes a processor to perform operations comprising:
receiving, by a computing device, point cloud data associated with a first fastener of a target object and generated by a robot during performance of a first stage of a first robot task;

determining a first value associated with a first fastener of the target object based at least in part on the point cloud data, the first value describing a first characteristic of the first fastener;

receiving sensor data associated with the first fastener of the target object and collected by the robot during performance of a second stage of the first robot task;

generating, using a machine learning model, a second value associated with the first fastener based at least in part on the sensor data, the second value comprising a prediction of a machine learning model, the second value describing the first characteristic of the first fastener, the first value and the second value represented in a coordinate system of the target object;

receiving a third value associated with a tool of a robot and obtained during performance of a third stage of the first robot task, wherein the third value is represented in the coordinate system of the robot;

generating a first data structure, wherein the first data structure comprises the first value, the second value, and the third value; and associating the first data structure with a second data structure, wherein the second data structure comprises a fourth value identifying the target object.

15. The computer readable medium of claim 14, wherein the instructions that, when executed by the processor, further cause the processor to perform operations comprising:

receiving a fourth value comprising a first timestamp of performance of the third stage of the first robot task; and populating the first data structure with the fourth value, wherein the first data structure comprises a digital representation of the first fastener at a first time indicated by the first time stamp, and wherein the first value and the second value respectively describe a location of the first fastener on the target object at the first time indicated by the first time stamp.

16. The computer readable medium of claim 14, wherein the first value is obtained from a point cloud of the target object implemented during the first stage, and wherein the second value is obtained from an output of a machine learning model implemented during the second stage.

17. The computer readable medium of claim 15, wherein the instructions that, when executed by the processor, further cause the processor to perform operations comprising associating the first data structure to a third data structure, wherein the third data structure comprises a digital representation of the first fastener at a second time indicated by a second time stamp, and wherein the first time and the second time occur during a life cycle of the target object.

18. The computer readable medium of claim 14, wherein associating the first data structure and the second data structure comprises storing a foreign key (FK) in the first data structure and storing a primary key (PK) in the second data structure, wherein the foreign key (FK) matches the primary key (PK).

19. The computer readable medium of claim 18, wherein the primary key (PK) is a first fastener identifier, and the foreign key (FK) is a target object identifier.

* * * * *